(12) United States Patent
Moinard et al.

(10) Patent No.: US 9,988,003 B2
(45) Date of Patent: Jun. 5, 2018

(54) VEHICLE STEERING WHEEL

(71) Applicant: Autoliv Development AB, Vårgårda (SE)

(72) Inventors: Fabrice Moinard, Vouzailles (FR); Yann Simonet, Poitiers (FR); Olivier Baribault, Thenezay (FR)

(73) Assignee: Autoliv Development AB, Vargarda (SE)

( * ) Notice: Subject to any disclaimer, the term of this patent is extended or adjusted under 35 U.S.C. 154(b) by 39 days.

(21) Appl. No.: 14/893,383

(22) PCT Filed: May 21, 2014

(86) PCT No.: PCT/EP2014/060391
§ 371 (c)(1),
(2) Date: Nov. 23, 2015

(87) PCT Pub. No.: WO2014/191266
PCT Pub. Date: Dec. 4, 2014

(65) Prior Publication Data
US 2016/0129860 A1 May 12, 2016

(30) Foreign Application Priority Data

May 27, 2013 (FR) ..................................... 13 01204

(51) Int. Cl.
*B62D 1/04* (2006.01)
*B60R 16/02* (2006.01)
(Continued)

(52) U.S. Cl.
CPC .............. *B60R 16/027* (2013.01); *B62D 1/04* (2013.01); *B62D 1/06* (2013.01)

(58) Field of Classification Search
CPC .......... B60R 16/027; B62D 1/04; B62D 1/06; B62D 1/065; B62D 1/11
See application file for complete search history.

(56) References Cited

U.S. PATENT DOCUMENTS 7,651,124 B2   1/2010  Gulde
7,852,225 B2 * 12/2010  Lemasson .............. B62D 1/046
                                                   340/407.1
(Continued)

FOREIGN PATENT DOCUMENTS

WO   WO-2010/113551 A1    10/2010
WO   WO-2016051776 A1 *   4/2016   .............. B62D 1/04

OTHER PUBLICATIONS

International Search Report and Written Opinion of the ISA for PCT/EP2013/060391, ISA/EP, Rijswijk, NL, dated Aug. 11, 2014.

*Primary Examiner* — Adam D Rogers
(74) *Attorney, Agent, or Firm* — Stephen T. Olson; Harness, Dickey & Pierce, P.L.C.

(57) ABSTRACT

A vehicle steering wheel comprising a metallic hub, a rim, and at least one branch including a mechanical connection piece attaching the rim to the hub. The vehicle steering wheel additionally includes at least one second branch of polymer injected between the hub and the rim without a mechanical connection piece attaching the rim to the hub, the at least one second branch including at least one energy conductor. The steering wheel further comprising positioning means for positioning the at least one energy conductor before the injection of the polymer of the branch in such a manner as to guarantee a minimal distance between the at least one energy conductor and a surface of the polymer once it is injected.

11 Claims, 2 Drawing Sheets

(51) Int. Cl.
*B60R 16/027* (2006.01)
*B62D 1/06* (2006.01)

(56) References Cited

U.S. PATENT DOCUMENTS

| | | | |
|---|---|---|---|
| 7,997,612 B2 | 8/2011 | Gulde | |
| 8,087,691 B2 | 1/2012 | Nebel et al. | |
| 8,474,867 B2 | 7/2013 | Nebel | |
| 8,499,454 B2* | 8/2013 | Kurata | B62D 1/06 29/894.1 |
| 8,636,302 B2 | 1/2014 | Nebel et al. | |
| 8,656,804 B2 | 2/2014 | Nagata | |
| 8,875,597 B2 | 11/2014 | Groleau et al. | |
| 9,073,571 B2* | 7/2015 | Muramatsu | B62D 1/11 |
| 9,139,217 B2 | 9/2015 | Bertrand et al. | |
| 9,352,768 B2 | 5/2016 | Doursoux et al. | |
| 2007/0194562 A1 | 8/2007 | Chapelain et al. | |
| 2008/0134832 A1 | 6/2008 | Matsu et al. | |
| 2010/0236353 A1 | 9/2010 | Valentine et al. | |
| 2012/0006148 A1 | 1/2012 | Nagata | |
| 2012/0048056 A1 | 3/2012 | Matsu et al. | |
| 2012/0240721 A1 | 9/2012 | Groleau | |
| 2013/0055849 A1 | 3/2013 | Parameshwara et al. | |
| 2014/0013898 A1 | 1/2014 | Doursoux et al. | |
| 2015/0329136 A1* | 11/2015 | Lofy | B62D 1/065 62/3.3 |
| 2016/0023667 A1* | 1/2016 | Sakurai | B60W 50/16 74/552 |
| 2016/0023677 A1* | 1/2016 | Sakurai | B62D 1/046 74/552 |
| 2016/0114826 A1* | 4/2016 | Moinard | B62D 1/046 74/552 |
| 2016/0288815 A1* | 10/2016 | Maekubo | B62D 1/06 |
| 2016/0347345 A1* | 12/2016 | Obayashi | B60R 21/2037 |
| 2017/0021854 A1* | 1/2017 | Mitobe | B62D 1/06 |

* cited by examiner

VEHICLE STEERING WHEEL

CROSS-REFERENCE TO RELATED APPLICATIONS

This application is a 371 U.S. National Stage of International Application No. PCT/EP2014/060391, filed May 21, 2014, which claims the benefit of and priority to French Patent Application No. 01204, filed May 27, 2013. The entire disclosures of the above applications are incorporated herein by reference

FIELD

The present invention relates in a general manner to a steering wheel intended to be mounted in an automobile, and in particular a steering wheel proposing a function requiring a supply of energy at the level of the rim.

BACKGROUND

Vehicle steering wheels with an energy consumer in its rim are known from the prior art such as the one described by the document WO2010113551A1. On the other hand, this system has in particular the disadvantage of requiring a positioning of the energy conductor (here an electrical conductor) in a branch of the steering wheel which supplies the energy consumer in order to guarantee that the conductor is not at the level of the surface of the polymer subsequently injected around the metallic structure. This positioning, realised by the metallic part between the hub and the rim, increases the cost of the metallic part on the one hand and limits the number of conductors that can run from the hub to the rim for reasons of space.

SUMMARY

One goal of the present invention is to respond to the disadvantages cited above and in particular, first of all, to propose a steering wheel with a simple metallic structure between the hub and the rim, and which nevertheless permits the possibilities of the passage of energy conductors to be increased between the hub and the rim without compromising the visual quality of the steering wheel.

To this end a first aspect of the invention relates to a vehicle steering wheel comprising:
  a metallic hub,
  a rim,
  at least a first branch comprising a mechanical connection piece attaching the rim to the hub,
characterised by that it comprises at least one other branch, or a second branch of injected polymer without the mechanical connection piece attaching the rim to the hub, and containing at least one energy conductor, wherein the steering wheel comprises positioning means designed to position the at least one energy conductor before the injection of the polymer of said second branch without the mechanical connection piece in such a manner as to guarantee a minimal or predetermined distance between said at least one energy conductor and a surface of the polymer once it is injected. The steering wheel according to the present invention does not require a complex internal structure since the energy conductor runs in a branch without mechanical connection (the metallic structure). However, the energy conductor should not be level with or be located on the surface of the injected polymer because it is positioned in the branch by positioning means. In other words, the energy conductor, once the polymer has been injected, is located inside the branch, surrounded in the polymer without being level with or exiting from the surface of the overmolding of the injected polymer, in particular in the visible zones or in zones being able to be touched by the driver, and the designer is therefore not obliged to add a mechanical connection piece into this branch. It is understood that the positioning means is not designed to transmit a torque between the hub and the rim, which corresponds to a force exerted by the driver in order to steer the vehicle or a force between the rim and the hub during an accident of the vehicle. In other words, the positioning means is not connected to the hub and/or to the rim by a screw or by a fixation by welding, for example.

According to an embodiment said second branch of injected polymer is arranged between the hub and the rim.

According to an embodiment the energy conductor supplies a motor, a heating system, a visual warning device or a measure and/or an input of information about or by the driver.

According to an embodiment the positioning means comprises a first coupling part designed to couple the positioning means to the hub and the positioning means comprises a second coupling part designed to couple the positioning means to the rim before the injection of the polymer. Since the positioning means is coupled to the hub on the one hand and to the rim on the other hand, it is perfectly positioned relative to these components before the injection of the polymer. The couplings can be realized by clipping.

According to an embodiment the rim is covered by a first foam and the second coupling part is designed to couple the positioning means to the first foam of the rim. This implementation allows a standard metallic rim to be used and realizes the coupling in a precise model without extra cost because the foam is specific to each steering wheel model.

According to an embodiment the positioning means comprises a first centering device and a second centering device designed to cooperate with an injection mould in order to localize the positioning means relative to the injection mould during the injection of the injected polymer. The localization relative to the injection mould guarantees a precise procedure, allows dispersions of the components to be compensated and avoids designing the device to be too rigid in order to not be deformed during the injection of the polymer.

According to an embodiment the first centering device is arranged between a first and a second end of the positioning means and it is arranged so as to block at least three degrees of freedom in translation of the positioning means relative to the injection mould. The first centering device, arranged in the middle of the positioning means, is blocked in translation relative to the injection mould, which prevents the positioning means from becoming offset in translation relative to the injection mould.

According to an embodiment the second centering device is arranged between the first centering device and the first end and it is arranged so as to block at least one degree of freedom in translation of the positioning means relative to the injection mould. The positioning means is blocked in translation by the first centering device and the blockage according to a translation by the second centering device allows the precision of the localization to be improved.

According to an embodiment the positioning means is a support of plastic.

According to an embodiment the positioning means is a device with a thin thickness comprising notches with blades arranged to guide said at least one energy conductor. The energy conductor is positioned between the blades and the rest of the positioning means.

According to an embodiment the at least one energy conductor is an electrical conductor.

According to an embodiment the at least one energy conductor is a conductor of heat transfer fluid.

A second aspect of the invention is an automobile comprising at least one steering wheel according to the first aspect of the invention.

BRIEF DESCRIPTION OF THE DRAWINGS

Other features and advantages of the present invention will appear more clearly from a reading of the detailed following embodiment of the invention given in a non-limiting manner by way of example and illustrated by the attached drawings, in which:

FIG. 1 shows an automobile steering wheel according to the invention. The steering wheel comprises four branches 10, 20, 30, 35 connecting a central hub 40 to a rim 50 that forms a holding part for a driver of the vehicle.

DETAILED DESCRIPTION

Figure 1:
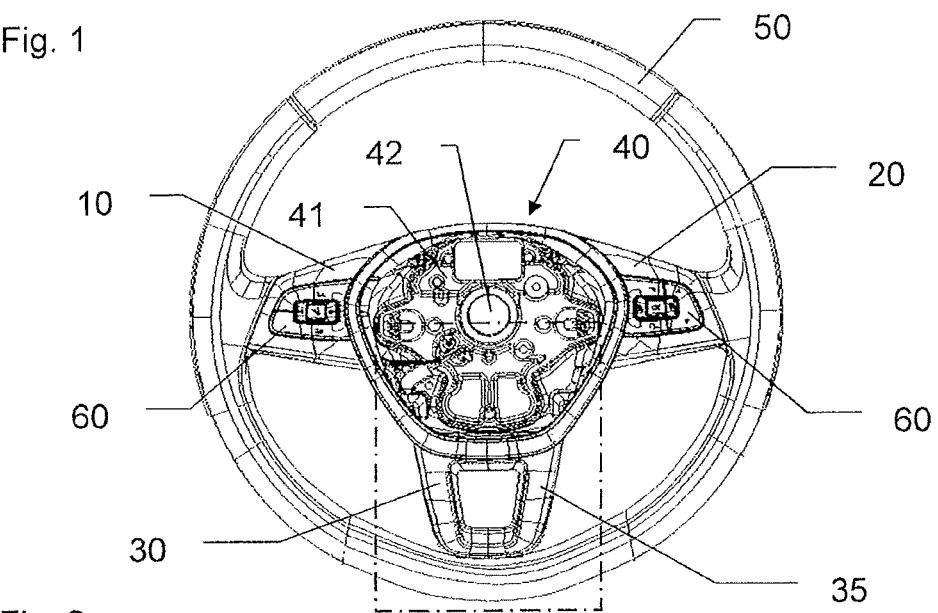
FIG. 1 shows a top view onto a steering wheel in accordance with the invention comprising positioning means in a branch of injected polymer.

The hub 40 comprises a metallic part 41 comprising a bore 42 for ensuring an interface for the mounting on a steering column (not shown).

The rim 50 comprises a metallic core in order to impart a good mechanical resistance to it. This metallic core is connected to the hub 40 by two mechanical connection pieces that are metallic pieces immersed in each of the branches 10 and 20, which can be called the first branches. Therefore, the rim 50 is perfectly attached to the hub 40 and correctly localised relative to it in such a manner that it is not necessary that the branches 30 and 35, which can be called the second branches, comprise a mechanical connection piece between the rim 50 and the hub 40 because the rigidity is sufficient. The mechanical connection pieces are moulded over during an injection of polymer in order to form the branches 10 and 20. It is possible to envisage using polyurethane for the injection polymer. The polyurethane in question here is therefore what is commonly called a lining foam or injected lining polymer and serves to cover the steering wheel frame (the mechanical structural pieces). In other words, the injected lining polymer is between the frame and the surface of the steering wheel (or can even form the outer surface). On the other hand the two branches 30 and 35 are integrally realized by lining polymer and do not participate in the mechanical resistance of the steering wheel. It is also possible to envisage using expanded polypropylene to serve as lining.

Furthermore, each of the branches 10 and 20 comprises control buttons 60 which serve as a man-machine interface for vehicle devices such as an automobile radio or a geolocalisation system, for example. These control buttons 60 are connected to the electrical system of the vehicle by electrical conductors that can be entirely or partially immersed in the injected polymer forming the branches 10 and 20. To this end the mechanical connection pieces connecting the rim 50 to the hub 40 serve as support for positioning these electrical conductors in order to guarantee that they do not touch the surface of the branches 10 and 20, which would form a lack of attractiveness, causing the steering wheel to become waste. The dimensions and the number of these electrical conductors connecting the control buttons 60 to the electrical system of the vehicle bring it about that it is difficult to implant the supplementary energy conductors in the branches 10 and 20.

However, it can be necessary to add devices or equipment to be supplied by energy in the rim 50, which requires being able to implant an energy conductor in one of the branches 10 or 20. For example, it is possible to envision a vibrating motor or an air-conditioning system in the rim 50 and it would be necessary to feed this equipment with electricity or a heat transfer fluid in order to realize the desired function. In particular, it is possible to envision implanting a visual warning device or a measure and/or an input of information about or by the driver of the vehicle.

Taking into account the constraint of localising energy conductors in the branches 10 or 20 in order to avoid the lack of attractiveness on account of the energy conductors at the level of the surface of the injected polymer, it would be necessary to increase the volume of the branches 10 and 20 in order to be able to run more energy conductors, but on account of the aesthetic constraints, this increase of volume is not possible and the number of energy conductors is therefore limited because it is necessary to be able to localise them in the injected polymer and the metallic connection pieces are therefore imperative.

The invention proposes running such a supplementary conductor in one of the branches 30 or 35 without adding a mechanical connection piece between the rim 50 and the hub 40. To this end the energy conductor between the rim 50 and the hub 40 is positioned in this branch 30 or 35 without the mechanical connection piece between the rim 50 and the hub 40 by positioning means that is not visible in this FIG. 1.

Figure 2:
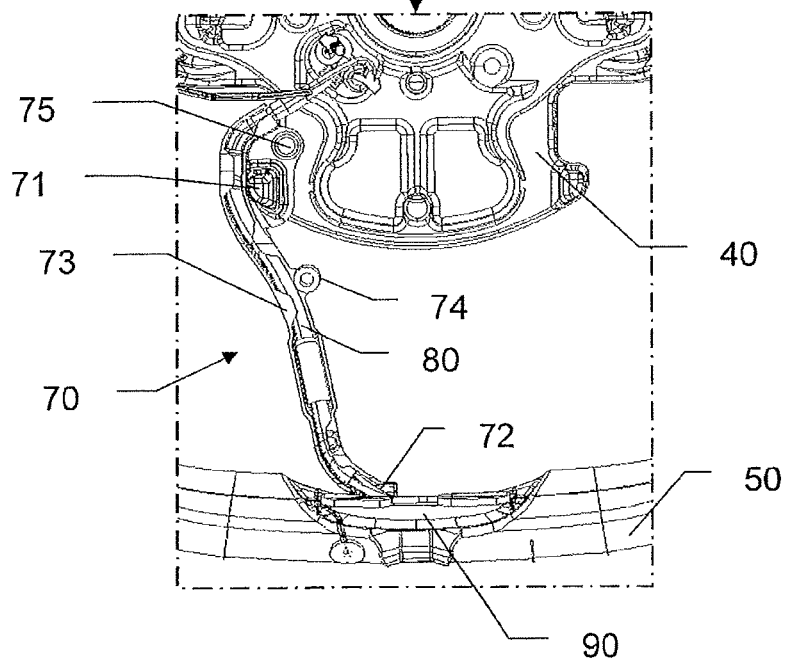
FIG. 2 shows a view of the steering wheel at the level of the positioning means before injection of the polymer.

FIG. 2 shows the steering wheel of FIG. 1 without the injected polymer at the level of the positioning means that will be immersed in the branch 30 after injection of the polymer. The positioning means is constituted by a support 70 of plastic that offers a positioning of the energy conductor 80 that connects a vibrator 90 to the electrical system of the vehicle. Therefore, the energy conductor 80 is correctly positioned relative to the hub 40 and the rim 50 so that during the operation of the injection of the polymer to form the branch 30, the energy conductor 80 is correctly immersed in the injected polymer and is situated at a predetermined distance from the surface of the branch 30 in order not to be level with the surface or cause a lack of attractiveness of the branch 30.

The energy conductor 80 is positioned by the support 70 by blades 73 that maintain the energy conductor 80 in contact with the support 70 so as to guarantee the position of the unit.

The support 70 is coupled to the hub 40 by a first part 71 that is a recess designed to cooperate with a projection of the hub 40. Moreover, a second part 72 of the support 70 allows it to be coupled to the rim 50. It is possible to envision a clipping of the second part 72 in a cavity of the rim 50, for example. The support 70 is then attached to the hub 40 and the rim 50 in order to permit the operation of injection into an injection mould.

During the operation of injection into the injection mould the support 70, already coupled to the hub 40 and the rim 50, is localized relative to the injection mould in order to guarantee that the conductor 80 is correctly immersed in the injected polymer. To this end the support 70 comprises a first centering device 74 and a second centering device 75. The first centering device 74 is arranged at a central position on the support 70 and cooperates with the injection mould in order to block at least three degrees of freedom in translation. As for the second centering device 75, it is arranged in the vicinity of an upper end of the support 70 and cooperates with the injection mould in order to block at least one degree of freedom in translation. In this manner a correct positioning of the support 70 in the injection mould is obtained that limits the deformations of support 70 that could cause blockages of the part in the mould.

Figure 3:
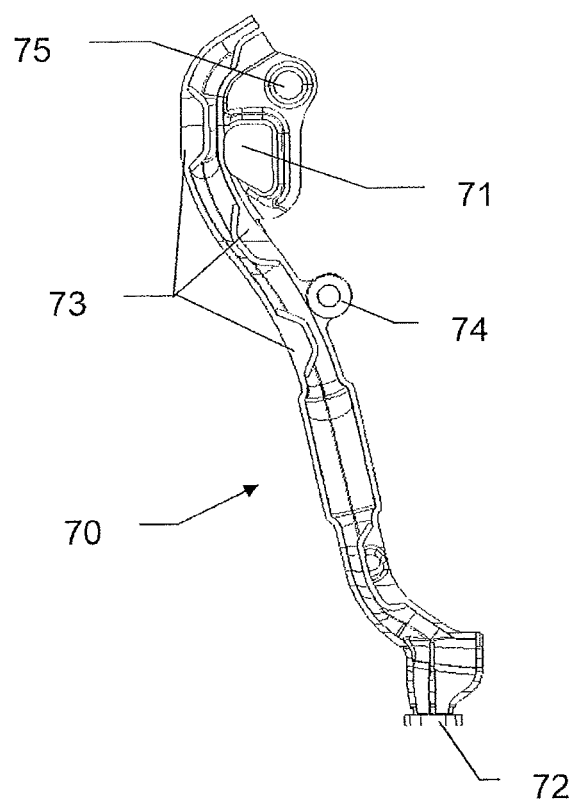
FIG. 3 shows a view of the positioning means.

FIG. 3 shows only the support 70. It therefore concerns a piece of plastic with a thin thickness which has a hollow or concave transversal section for being able to house the energy conductor 80. The blades 73 allow the energy conductor 80 to easily slide between them and the rest of the body of the support 70. It is possible to envisage making the support 70 of polyamide, for example.

The invention therefore allows the possibility of making an energy conductor 80 run in a steering wheel branch 30 or 35 without requiring a metallic connecting piece forming a support between the hub 40 and the rim 50 for positioning the energy conductor 80 with less expense while guaranteeing a good quality of attractiveness.

Therefore, it is possible to propose or not propose an option for heating the rim or causing the steering wheel to vibrate without modifying the base metallic unit of hub 40-rim 50 and the mechanical connection piece in the branches 10 and 20.

It is understood that various modifications and/or improvements obvious to a parson skilled in the art can be added to the different embodiments of the invention described in the present description without leaving the scope of the invention defined by the attached claims.

The invention claimed is:

1. A vehicle steering wheel comprising:
   a metallic hub;
   a rim;
   at least one first branch connecting the metallic hub to the rim;
   at least one second branch consisting of a plastic support and an injected polymer, the plastic support is coupled to the metallic hub and the rim, the injected polymer surrounds the plastic support; and
   an energy conductor carried by the plastic support, the energy conductor is completely surrounded by the injected polymer.

2. The steering wheel according to claim 1, wherein the plastic support is coupled to the hub by a first part and coupled to the rim by a second part before an injection of the polymer.

3. The steering wheel according to claim 1, wherein the plastic support further comprises a first centering device and a second centering device.

4. The steering wheel according to claim 3, wherein the first centering device is arranged between a first and a second end of the plastic support and blocks at least three degrees of freedom in translation of the plastic support.

5. The steering wheel according to claim 4, wherein the second centering device is arranged between the first centering device and the first end and blocks at least one degree of freedom in translation of the plastic support.

6. The steering wheel according to claim 1, wherein the plastic support includes blades for guiding the energy conductor.

7. The steering wheel according to claim 1, wherein the energy conductor is an electrical conductor.

8. The steering wheel according to claim 1, wherein the energy conductor is a conductor adapted to be fed with a heat transfer fluid.

9. The steering wheel according to claim 1, in combination with an automobile.

10. A vehicle steering wheel comprising:
    a metallic hub;
    a rim;
    a first branch connecting the metallic hub to the rim;
    a second branch connecting the metallic hub to the rim, the second branch including a plastic support and an injected polymer, the plastic support extending between the metallic hub and the rim, the injected polymer surrounding the plastic support; and
    an energy conductor carried by the plastic support, the energy conductor completely surrounded by the injected polymer.

11. The vehicle steering wheel of claim 10, wherein the rim is a complete circle.

* * * * *